Reissued May 10, 1938

Re. 20,718

UNITED STATES PATENT OFFICE 20,718

CHEMICAL COMPOUND

Willi Brün, Bridgeport, Conn., assignor to Remington Arms Company, Inc., a corporation of Delaware No Drawing. Original No. 1,943,513, dated January 16, 1934, Serial No. 569,838, October 19, 1931. Application for reissue July 21, 1937, Serial No. 154,806

13 Claims. (Cl. 52—4)

This invention relates to certain new chemical compounds of a somewhat explosive nature, to the preparation of such compounds, and to their use either alone or in conjunction with other substances as explosive compositions, particularly as compositions for use as ammunition priming mixtures.

The compounds are derivatives of ortho cresol. Confusion exists as to the naming of the derivatives of ortho cresol, due to the fact that the benzene ring contains two substitutions, one a methyl substitution and the other a hydroxyl substitution. The cresols may be considered as derived either from phenol or from toluene. In identifying the derivatives of ortho cresol, such as those containing nitro substitution groups, these groups may be located either from the methyl group or from the OH group. Beilstein (vol. VI) gives alternative nomenclature, using the term "cresol" when and only when the position of the hydroxy group is considered as "1" position. Other literature and commercial practice has not always followed Beilstein's nomenclature. In recognition of the existing confusion Beilstein's 1931 supplement takes the extraordinary precaution of including structural formulas in the text. The cresol derivative which is utilized by the applicant in the present invention contains two separated nitro groups and is the only known dinitro-ortho-cresol in which the nitro groups are separated. It is identified by commercial suppliers as "3-5 dinitro-ortho-cresol", and is identical with the compound which Beilstein identifies as "4-6 dinitro-ortho-cresol". For the purpose of this specification, the commercial identification will be used, it being understood that the compound is also known as "4-6 dinitro-ortho-cresol".

By the addition, under suitable conditions, of lead nitrate solutions to solutions of 3-5 dinitro ortho cresol, two new compositions of matter have been made which are indicated by analysis to be, respectively, mono-basic lead 3-5 dinitro cresylate and di-basic lead 3-5 dinitro cresylate, and in this specification will be so identified.

The mono-basic lead salt is prepared as follows: A solution of 1.98 grams of 3-5 dinitro-ortho-cresol and .8 gram of sodium hydroxide in 100 c. c. of water is dropped into a solution of 3.5 grams of lead nitrate in 100 c. c. of water, at a temperature between 70° and 80° C. The precipitate, which is of a light yellow color and of fluffy character, is filtered off and washed with water. It has a lead content of 48.84%, corresponding substantially to the theoretical lead content, 49.19%, of mono-basic lead 3-5 dinitro-ortho-cresylate.

The di-basic lead salt is prepared as follows: A solution of 1.98 grams of 3-5 dinitro-ortho-cresol and 1.2 grams of sodium hydroxide in 100 c. c. of water is dropped slowly into a solution of 10.5 grams of lead nitrate in 100 c. c. of water, at a temperature between 80° and 90° C. After cooling, the precipitate is filtered off, washed and dried. Said precipitate is in the form of brownish rhombic crystals. It will be noted that the quantity of lead nitrate is an excess of about 100% over the theoretically re-acting quantity. It is necessary to use such an excess of lead nitrate in order to secure a crystalline precipitate. The use of the theoretical quantity results in an amorphous yellow precipitate only. The precipitated compound is found upon analysis to have a lead content of 57.35% which is almost identical with the theoretical lead content, 57.36%, of di-basic lead 3-5 dinitro-ortho-cresylate.

Both of these salts have been found useful as priming mixture ingredients, particularly priming mixture fuels. The di-basic salt, however, is preferred for this purpose on account of its greater density and crystalline character. The semi-explosive character of either salt adds to its value as a priming mixture fuel, since mixtures containing such semi-explosive fuels tend to be more sensitive to percussion than mixtures utilizing only inert substances as fuels.

Typical priming mixtures are included in the following table:

| | Per cent |
|---|---|
| Mercury fulminate | 30 to 50 |
| Barium nitrate | 20 to 40 |
| Mono-basic or di-basic lead 3-5 dinitro-ortho-cresylate | 5 to 15 |
| Abrasive substantially | 20 |

This formula, however, is merely typical. The explosive, mercury fulminate, may be replaced wholly or in part by a nitro organic compound, such as a lead salt of styphnic acid, or such a salt in admixture with guanylnitrosaminoguanyltetrazene, lead methylene di-iso nitro amine, di-azo-di-nitro phenol, a lead salt of picric acid, and similar explosive bodies. Suitable non-corrosive oxidizers include other nitrates, such as normal or basic lead nitrate, chromates, permanganates, oxides and peroxides. Other fuels, such as lead sulphocyanate, antimony sulphide and/or calcium silicide, may likewise be used in conjunction with the lead salts of 3-5 dinitro ortho cresol.

The said lead salts being themselves novel, the appended claims are to be broadly construed.

What is claimed is:

1. As a composition of matter, a lead salt of 3-5 di-nitro ortho cresol.

2. As a composition of matter, a basic lead salt of 3-5 dinitro ortho cresol.

3. As a composition of matter, mono-basic lead 3-5 di-nitro ortho cresylate.

4. As a composition of matter, di-basic lead 3-5 di-nitro ortho cresylate.

5. A priming composition containing a lead salt of 3-5 dinitro ortho cresol.

6. A priming composition containing a basic lead salt of 3-5 dinitro ortho cresol.

7. A priming composition containing mono-basic lead 3-5 di-nitro ortho cresylate.

8. A priming composition containing di-basic lead 3-5 di-nitro ortho cresylate.

9. A priming composition containing a lead salt of 3-5 di-nitro ortho cresol, a suitable combustion initiator, and a suitable oxidizer.

10. A priming composition containing di-basic lead 3-5 di-nitro ortho cresylate, a suitable combustion initiator, and a suitable oxidizer.

11. The method of making a lead salt of 3-5 di-nitro ortho cresol which comprises the addition to an aqueous solution of lead nitrate of an aqueous solution of sodium hydroxide and 3-5 di-nitro ortho cresol.

12. The method of making mono-basic lead 3-5 dinitro ortho cresylate, which comprises precipitating said salt by the addition to a solution of 3.5 grams of lead nitrate in 100 c. c. of water of a solution of 1.98 grams of 3-5 di-nitro ortho cresol and .8 gram of sodium hydroxide in 100 c. c. of water at a temperature between 70° and 80° C.

13. The method of making di-basic lead 3-5 di-nitro ortho cresylate, which comprises precipitating said salt by the addition to a solution of 10.5 grams of lead nitrate in 100 c. c. of water of a solution of 1.98 grams of 3-5 di-nitro ortho cresol and 1.2 grams of sodium hydroxide in 100 c. c. of water at a temperature between 80° and 90° C.

WILLI BRÜN.